United States Patent [19]

Morrison et al.

[11] 4,103,983
[45] Aug. 1, 1978

[54] QUICK DISCONNECT SLIDE MOUNT

[75] Inventors: Lowell D. Morrison; Howard R. Moon, both of Fort Atkinson, Wis.

[73] Assignee: Gamber-Johnson, Inc., Stevens Point, Wis.

[21] Appl. No.: 783,082

[22] Filed: Mar. 30, 1977

[51] Int. Cl.² ............................................. H01R 13/54
[52] U.S. Cl. ........................... 339/91 R; 70/DIG. 57; 248/201
[58] Field of Search ................ 339/75 R, 75 M, 91 R; 248/201, 203; 70/58, DIG. 57, DIG. 58

[56]    References Cited
U.S. PATENT DOCUMENTS

| 3,513,478 | 5/1970 | Kemper et al. | 339/91 R |
|---|---|---|---|
| 3,993,278 | 11/1976 | Race | 248/203 |
| 4,024,737 | 5/1977 | McInturff | 70/58 |
| 4,050,663 | 9/1977 | Rogers | 248/203 X |
| 4,050,767 | 9/1977 | Berning | 339/91 R X |
| 4,063,683 | 12/1977 | Jones | 339/91 R X |

Primary Examiner—Granville Y. Custer, Jr.
Assistant Examiner—E. F. Desmond
Attorney, Agent, or Firm—Clarence A. O'Brien; Harvey B. Jacobson

[57] ABSTRACT

A slide mount for removably supporting a citizen'band (CB) radio or similar electronic equipment in a vehicle, or the like, or any other mounting surface, including a base attached to the vehicle and a slide attached to the CB radio and a quick disconnect structure for mechanically engaging the slide with the base and releasably latching the slide in position and also providing quick disconnect pin and socket-type connections between antenna circuits and electrical circuits so that the CB radio may be easily installed and removed with the installation and removal automatically coupling all of the components to the radio so that it may be operated immediately upon completion of the slide connection. A longitudinally movable release plate is provided on the slide to release a spring tab or lug engaged with a detent on the base so that outward longitudinal force exerted on the release plate at the end of the slide facing the operator of the radio will readily release the slide for removing the radio and slide assembly. The pin and socket contact assemblies are arranged so that the antenna and other pin and socket connections are completed prior to the completion of the power and ground pins and sockets in order to prevent any possibility of damage to the equipment resulting from being placed under power with either the antenna or speaker circuits disconnected. The structural interconnection between the slide and base is such that the slide can be readily aligned with the base and a tapered structure is provided so that when the slide is completely installed, very little play exists between the slide and base.

12 Claims, 7 Drawing Figures

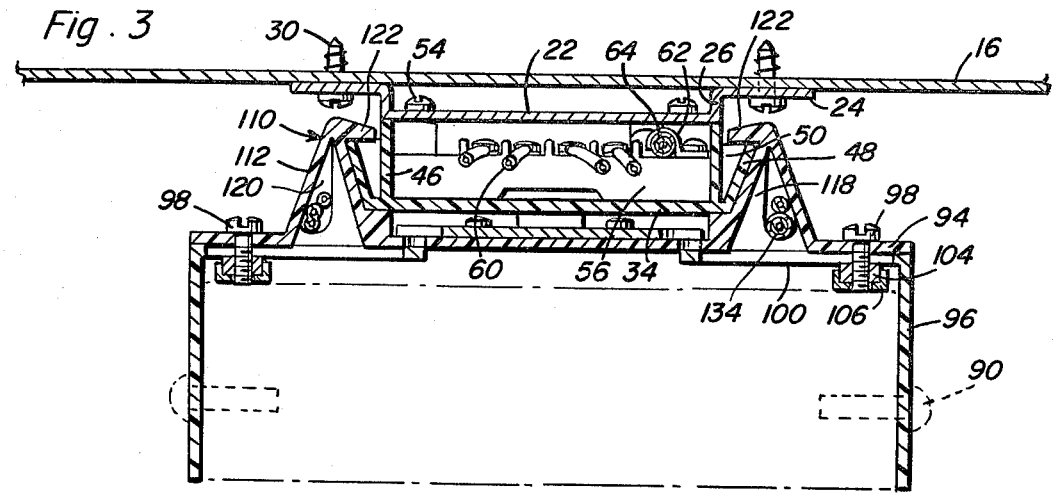
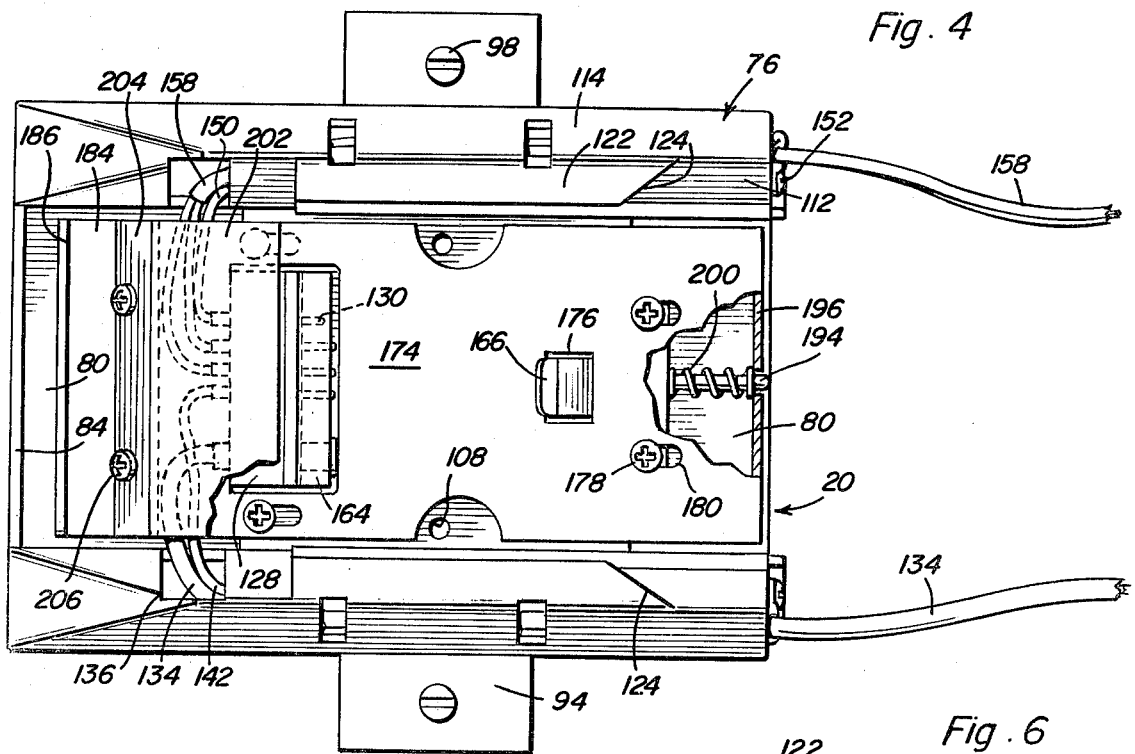
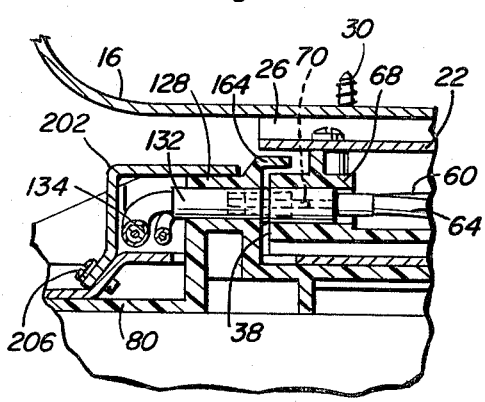
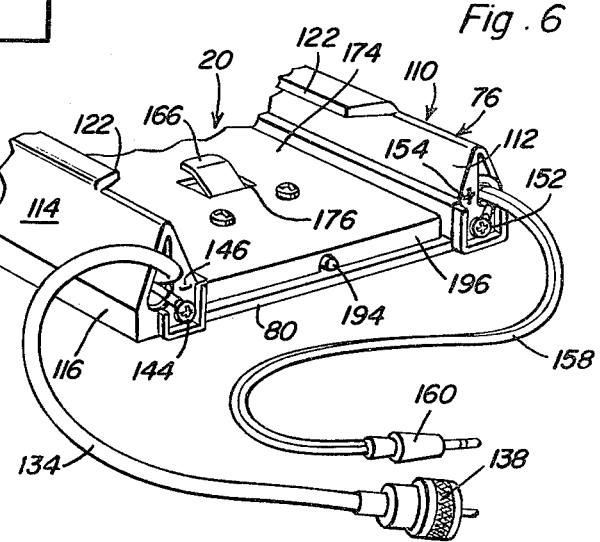

QUICK DISCONNECT SLIDE MOUNT

BACKGROUND OF THE INVENTION

1. Field of the Invention

The present invention generally relates to a mounting structure for CB radios, tape players, and other electronic equipment, so that such equipment can be readily removed for storage in a safe place, and includes a base and slide with beveled components mechanically interconnecting the base and slide for precise alignment and easy insertion and removal and pin and socket-type electrical connections to assure contact between conductive components on the base and slide.

2. Description of the Prior Art

Many automotive vehicles are equipped with CB radios, tape players, and other similar equipment which usually are mounted under the dashboard, on the transmission hump, on the firewall, on the roof, or in other accessible areas, so that the controls of such equipment are accessible to the operator of the vehicle. Such equipment has been subject to a high incidence of theft leading to the provision of slide mounts to enable such equipment to be removed from a readily observable and accessible area for safe storage in the home, in the trunk of the vehicle, or in any other desired safe location. Prior U.S. Pat. Nos. 3,822,049 and 3,513,478 disclose exemplary developments in this field. Both of these patents disclose a two-component mounting structure, including a base which may be suspended under the dashboard of an automobile, or the like, and a slide which is attached to the radio, tape player, or other equipment, with contact arrangements being provided so that when the slide is slid into mounting engagement with the base, electrical circuits will be completed. One of the problems which has existed with equipment of this type is difficulty in properly aligning the slide with the base which is especially a problem when trying to assemble the slide onto the base when the person performing this task is at an awkward position in relation to the components or when light conditions interiorly of the vehicle are very poor. Another problem which has existed is damage to the electrical contact arrangements which renders them inoperative. In addition to not making electrical contact, CB radios may be severely damaged if they are operated without the antenna being connected to the radio. Thus, if the contact assembly for the antenna on the base or slide is damaged so that completion of the coaxial circuits is not satisfactory, operation of the CB radio can severely damage the radio and require costly repairs.

SUMMARY OF THE INVENTION

An object of the present invention is to provide a quick disconnect slide mount for CB radios, amateur radios, tape player units, or similar electrical or electronic equipment, which includes a base and a slide constructed of plastic material having characteristics of strength, slidability and electrical insulation and constructed so that the mating parts self-align precisely and have a minimum of play when assembled.

Another object of the invention is to provide a slide mount in accordance with the preceding object in which the engaging surfaces of the base and slide are beveled with the slide including wraparound gripping parts which are omitted for a portion of the length thereof at the inner end to provide for easy engagement without fumbling or groping to bring the parts into alignment with the interengaging parts also being tapered from front to back so that when fully engaged, there is a minimum of side play.

A further object of the invention is to provide a slide mount in accordance with the preceding objects in which the base and slide are locked together by a spring tab or lug engaged with a detent with the spring locking lug or tab being retracted by a longitudinally slidable release plate which is drawn forward in the direction of removal to release the spring locking tab so that the same forward longitudinal force exerted to release the spring locking tab will also move the slide into disengagement from the base.

Still another object of the present invention is to provide a slide mount including a base and slide having pin and socket electrical connectors snapped permanently into shoulder holes molded into the base and slide to assure perfect alignment for engagement of the pins and sockets.

Still another important feature of the invention is to provide a slide mount with pin and socket connectors as set forth in the preceding object in which one pair of the pins and sockets is of the coaxial type for the purpose of connecting an antenna with the pins so arranged that the power and ground pins do not make contact until after all the other pins have made contact in order to prevent damage to the equipment resulting from being placed under power with either the antenna or speaker circuits disconnected.

Yet another important feature of the present invention is to provide a slide mount having two adjustable brackets for accommodating equipment of different widths with the slide mount being attractive in appearance and compact in construction and adaptable for various uses in quickly and easily installing a CB radio or similar equipment in an automobile or other vehicle and quickly disconnecting such equipment for removal.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 3 is a transverse, sectional view taken substantially upon a plane passing along section line 3—3 of FIG. 2 illustrating further structural details of the slide mount.

FIG. 4 is a plan view of the slide with portions of the release plate broken away to illustrate the spring return mechanism.

FIG. 5 is a fragmental sectional view illustrating specific structural details of the coaxial pin and socket connector.

FIG. 6 is a fragmental rear perspective view of the slide.

DESCRIPTION OF THE PREFERRED EMBODIMENT

Figure 1:
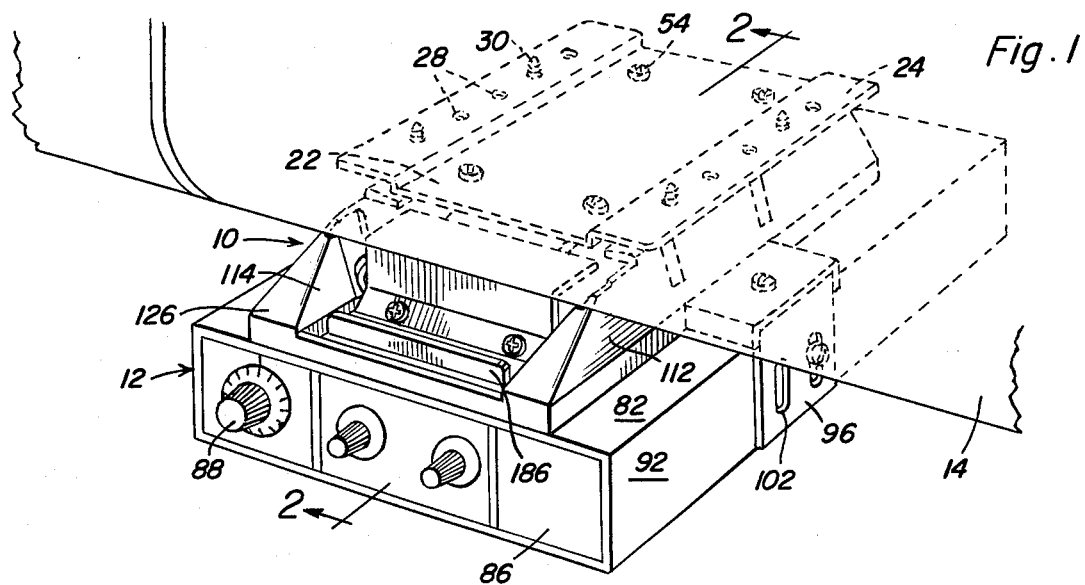
FIG. 1 is a perspective view of the slide mount of the present invention illustrating the invention in use for supporting a CB radio in underlying relation to the dashboard of a vehicle.

Referring now specifically to the drawings, the quick disconnect slide mount of the present invention is generally designated by numeral 10 and is illustrated in use for supporting a CB radio generally designated by numeral 12 in suspended underlying relation to the dashboard 14 of an automobile or other similar vehicle which is normally provided with a generally horizontally disposed flange 16 at the lower edge thereof which extends toward the firewall of the vehicle. Various types of amateur radios, stereo tape players, or the like, may be supported by the slide mount 10 and the slide mount 10 may be utilized for supporting the CB radio or other equipment from the vehicle on supporting surfaces other than a dashboard. For example, the slide mount 10 may be utilized to support the equipment from the firewall, roof, transmission hump, or accessory devices enabling the equipment to be positioned in any desired relationship within the vehicle or other supporting surface. For example, the slide mount may be used in combination with the device disclosed in the pending application of Bradley W. Johnson, U.S. Ser. No. 772,342, for Roof or Floor CB Radio Mount, filed Feb. 25, 1977. Accordingly, while the device is disclosed in association with the dashboard 14 of a vehicle for supporting a CB radio therefrom for easy disconnection, the slide mount may be used for supporting various types of equipment in various orientations.

The slide mount 10 includes two components, namely, a base 18 and a slide 20, with the base 18 being attached to the dashboard flange 16, or other supporting surface, and the slide 20 being attached to the CB radio 12, or other electrical or electronic equipment.

The base 18 includes a cover plate 22 having parallel side edge mounting flanges 24 offset upwardly by an offset portion 26 with the flange 24 including a plurality of longitudinally spaced apertures 28 for receiving mounting screws 30 which may be secured to the flange 16 in any suitable manner, such as by screw threading directly through an opening in the flange 16, with the fastening screws 30 being sheet metal screws, and the like. The plurality of apertures 28 enables the mounting of the base 18 in any desired relation to the flange 16 on the dashboard 14 thereby rendering the device substantially universal in installation.

Figure 2:
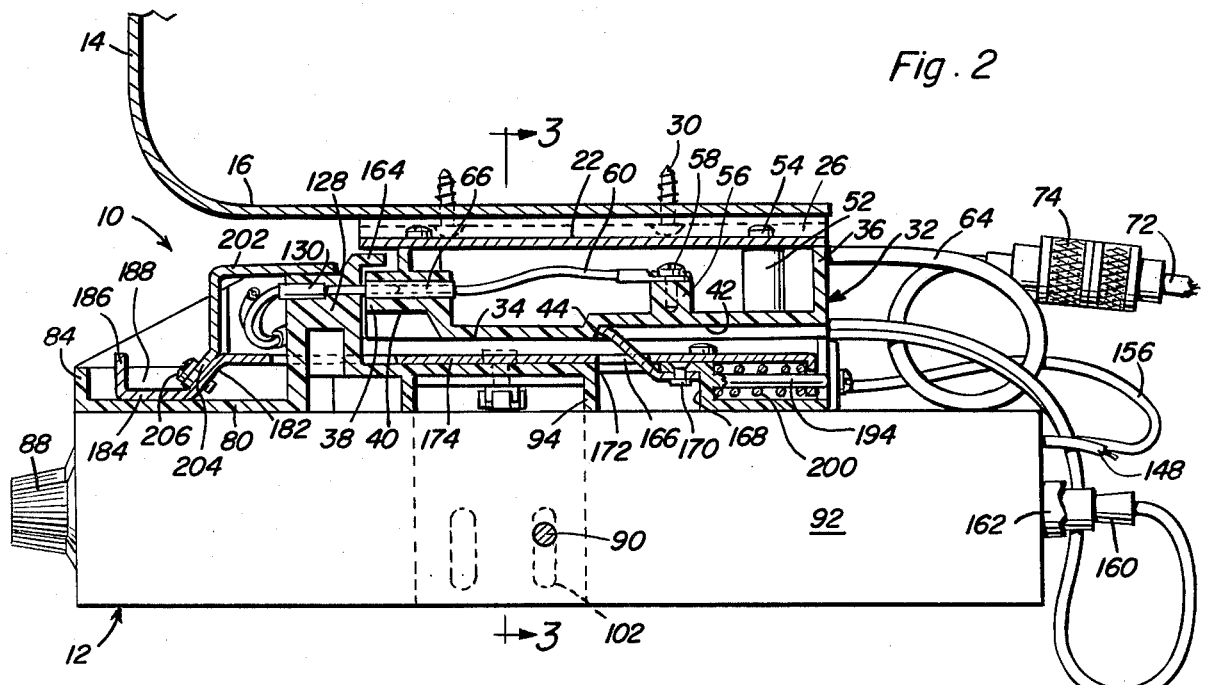
FIG. 2 is a longitudinal, sectional view taken substantially upon a plane passing along section line 2—2 of FIG. 1 illustrating the structural details and association of the components of the slide mount.

The base 18 also includes a hollow body generally designated by numeral 32 which includes a bottom wall 34 generally paralleling and spaced from the cover plate 22. The inner or rear edge of the bottom wall 34 is provided with an end wall 36 perpendicular thereto and engaged with the cover plate 22, as illustrated in FIG. 2, and the outer or front end of the bottom wall 34 is provided with an upstanding front end wall 38, with the bottom wall 32 having a centrally disposed recessed area 40 at the forward end thereof and a longitudinally extending recess 42 centrally in the rear thereof, as illustrated in FIG. 2, with the forward end of the recess 42 being upwardly offset to define a detent or shoulder 44. Each side edge of the bottom wall 34 is provided with a vertically extending wall 46 perpendicular to the bottom wall 34 and an outwardly and upwardly inclined flange 48 outwardly of the wall 46 and terminating below the upper edge of the wall 46 with the flange 48 being reinforced by gussets 50 between the wall 46 and the flange 48. The beveled or inclined construction of the flange 48 and the relationship of the upper edge thereof to the walls 46 and the cover plate 22 is best illustrated in FIG. 3. The interior of the side walls 46 is provided with bosses 52 into which screw threaded fasteners 54 extend, with the fasteners 54 also extending through suitable apertures in the cover plate 22 thereby removably securing the cover plate 22 to the body 32.

Disposed transversely between the side walls 46, generally in the center thereof, is a transverse terminal block 56 having a plurality of screw threaded fasteners 58 extending into the top surface thereof and forwardly extending electrical conductors 60 connected thereto. At one end of the terminal block 56, a clip 62 is provided for securing a length of coaxial cable 64 thereto with the cable extending through a notch in the rear wall 36. Additional electrical leads for connection with the conductors 60 by engagement with the fasteners 58 may pass through a notch in the rear wall 36 remote from the notch which receives the cable 64. The conductors 60 extend forwardly and are connected to sockets 66 which are embedded in a socket block 68 with the sockets 66 in horizontal position. Likewise, the coaxial cable 64 extends forwardly and is connected to a coaxial socket 70, likewise embedded in the socket block 68 with the sockets 66 and 70 opening through the front wall 38 of the body 32. An adequate number of sockets and electrical conductors is provided for the installational requirements, including the coaxial cable for connection with an antenna used in conjunction with a CB radio, a power supply, a ground and speaker leads, if necessary. All of the sockets terminate flush with the forward surface of the end wall 38 so that when the slide 20 is removed, there is no possible way that the sockets can be damaged and the bottom surface of the wall 34 is substantially smooth, except for the recesses 40 and 42 and the flanges 48 define smooth external wall surfaces. The base 18 is permanently mounted and the coaxial antenna cable 64 is connected to the coaxial cable 72 which extends to the external antenna through a standard and conventional screw threaded coaxial connector 74. Also, the power and ground leads and speaker leads, if used, also are permanently connected to the terminal block 56, so that once installed, the base 18 becomes a permanent portion of the vehicle structure. The body 32 including all of the walls, terminal block and socket block is of one piece plastic construction formed in any desired manner with sufficient rigidity and insulation characteristics, so that the terminal block fasteners and sockets are connected directly into the plastic material. The plastic material may be any suitable color and may be textured to eliminate glare although the base, when installed is substantially concealed by the forward edge of the dashboard.

The slide 20 includes a plastic body generally designated by numeral 76 which includes a bottom wall 80 disposed in overlying engagement with the top wall 82 of the housing of the CB radio 12 with the forward end of the bottom wall 80 including a front end wall 84 oriented substantially flush with the forward end wall 86 of the CB radio 12 from which the controls 88 normally project, although this relationship may vary, i.e., the radio 12 may be spaced rearwardly of or forwardly from the front wall 84 depending upon the locational position of the normally provided fastening screw or screws 90 that are threaded into the side wall 92 at each side of the CB radio. Centrally of the bottom wall 80, a transversely extending, downwardly opening channel-shaped member 94 is provided, with the channel-shaped member extending beyond the edges of the body 76, as illustrated in FIG. 4. The outer ends of the channel-shaped member 94 receive L-shaped brackets 96 which are secured thereto by a fastener 98 extending through the channel-shaped member 94 and through a slot 100 in the leg thereof which underlies the channel-shaped member 94. The depending leg of the bracket 96 includes a pair of slots 102 for adjustably and selectively receiving the screw fastener 90, thus enabling the slide to be secured to CB radios or other units having various dimensional characteristics. The fastener 98 includes a nut 104 on the inner end thereof underlying the horizontal leg of the bracket 96 and a sheet metal cage 106 secures the nut frictionally and longitudinally adjustably to the slot 100 to facilitate assembly of the brackets 96 and the fasteners 98 in adjusted position. Also, the channel-shaped member 94 may be provided with additional apertures, such as at 108, to receive the fasteners 98 when it is desired to receive and support a relatively narrow CB radio or other equipment. Also, as illustrated in FIG. 2, the bottom edges of the channel-shaped member 94 are in the same horizontal plane as the bottom surface of the bottom wall 80 for stabilizing the body 76 with respect to the housing of the CB radio 12.

The side edges of the bottom wall 80 of the body 76 includes an upward projection generally in the form of an inverted V-shaped side member 110, the configuration of which is illustrated in FIG. 3, and includes an inner wall 112 which inclines upwardly and outwardly and an outer wall 114 which inclines downwardly and outwardly and which terminates in a vertical bottom portion 116, as illustrated in FIG. 6. Where the channel-shaped member 94 intersects the side members 110, the channel-shaped member is continuous, as illustrated in FIG. 3. Also, reinforcing webs 118 are provided for the interior of the hollow side members 110 with the web members toward the rear of the side members not being complete to define an opening 120 for a purpose hereinafter described.

At the upper edge of each of the hollow side members 110, an inwardly extending wraparound flange 122 is provided which extend inwardly toward each other in generally parallel relation and define a generally horizontal surface facing downwardly for engaging the top edges of the flanges 48 on the base 18, as illustrated in FIG. 2. The upper surface of the flanges 122 are inclined downwardly and inwardly slightly and the rear edge of the flange 122 is spaced forwardly from the rear edge of the side members 110, as illustrated in FIGS. 4 and 6, with the rear edge of the flange 122 being inclined or slanted as indicated by numeral 124. This construction enables the rear edge of the slide 20 to be brought upwardly into engagement with the forward edge of the base 18 so that the downwardly and inwardly inclined surfaces defined by the rear end portions of the walls 112 rearwardly of the flanges 122 will centralize and align the slide 20 with the base, since the inclined surface of the flanges 48 will mate with and engage the inclined surfaces of the walls 112. The inclined rear end edges 124 of the flanges 122 also facilitate such alignment by engaging the ends of the side walls 46 on the base 18 if misaligned. The inclined configuration of the flanges 48 and the walls 112 together with the flanges 122 provides a precise and quick alignment of the slide and base and these surfaces are provided with a slight taper so that when the slide is moved all the way rearwardly into mounting engagement on the base, there is very little side or vertical play left, thus providing a stable and substantially rigid connection between the slide and base.

Figure 7:
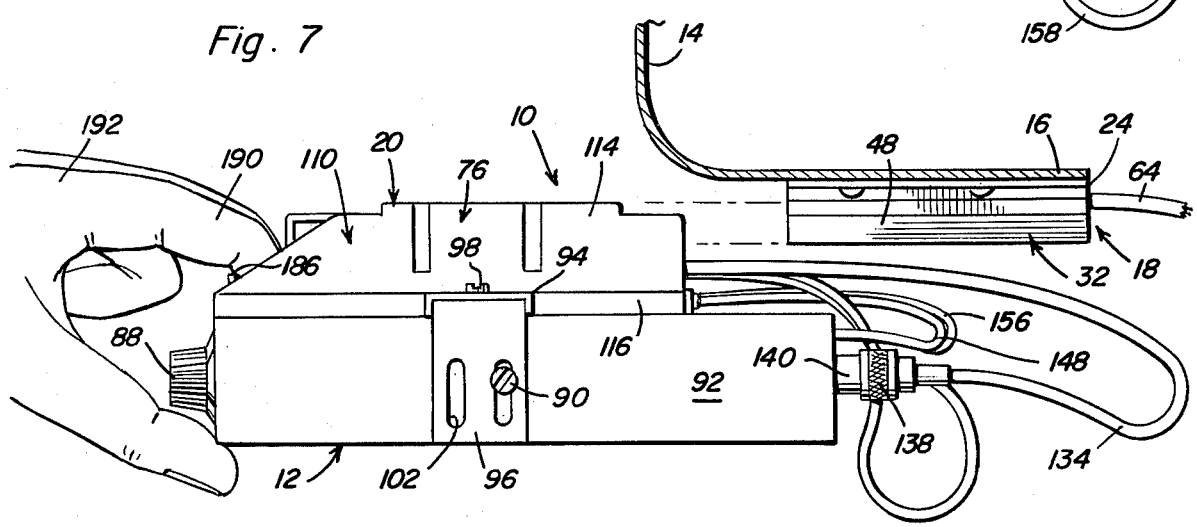
FIG. 7 is a side elevational view illustrating the movement of the slide in relation to the base when removing the slide and radio attached thereto.

Adjacent the forward end of the side members 110, the walls 112 and 114 are slanted downwardly and provided with an inclined top wall or connecting wall surface 126, as illustrated in FIG. 1. Also, extending between but terminating short of the side members 110 is a transversely extending pin block 128 having a plurality of electrical connector pins 130 embedded therein and projecting from the rearward surface thereof for telescoping electrical connection with the sockets 66 when the slide is assembled onto the base. The pin block 128 also includes a coaxial connector pin assembly 132 which coacts with and is telescopically engaged with the coaxial socket 70 with both of these components including telescopic, concentric contacts which are insulated from each other by an insulating sleeve. The coaxial pin and socket connection 132 is connected with a coaxial cable 134 which extends through an opening 136 in the inner wall 112 of the side member 110 adjacent thereto and extends through the openings 120 in the reinforcing member 118 and out the rear of the side member 110 as, illustrated in FIG. 6, with a conventional connector 138 on the terminal end thereof for engagement with the female connection 140 on the rear of the CB radio 12. Also, the pin 130 having the ground wire 142 connected thereto extends rearwardly alongside of the coaxial cable 134 and is connected to a screw threaded fastener or terminal 144 at the rear of the side member 110, as illustrated in FIG. 6, with a negative symbol 146 formed in the plastic material indicating that the ground wire or black wire from the CB radio is to be connected thereto, as indicated by numeral 148 in FIG. 7. The power conductor or red wire 150 extends through a similar opening in the other side member 110 and is connected to a terminal 152 at the rear thereof, as illustrated in FIG. 6, with a positive symbol 154 formed in the plastic material so that the power lead or red wire to the CB radio 12, as indicated by numeral 156, will be connected thereto. Also, electrical leads 158 extending to an external speaker plug 160 parallels the power lead 150 and is connected with appropriate pins 130. Thus, if an external speaker is utilized, the speaker plug 160 may be suitably plugged into the female external speaker jack 162 on the rear of the CB radio in a well known manner, so that the external speaker connected with the speaker terminal 58 in the base may be actuated. The hollow side members 110 serve as conduits to carry the cables and wires in a protected and visually concealed manner to the rear of the slide where they will be in close proximity to the connections on the rear of the radio. As illustrated in FIG. 5, a visor or ledge 164 extends rearwardly in slightly upwardly offset relation from the pin block 128 so that it is in overlying relation to the pins 130 and 132 and also will be received in overlying relation to the socket block 68, as illustrated in FIGS. 2 and 5, for protecting the pins when the slide is disconnected from the base. The base 18 and cover plate 22 form a fully enclosed junction box to protect connections from damage or shorting especially when the radio and slide are removed. Also, the pin 130 connected with the power lead 150 is slightly shorter than the other pins in order to assure that before the power connection is made to the CB radio, all of the other pins will have made electrical contact, thereby avoiding damage to the CB radio or other equipment which can occur if the radio is powered prior to connection of the antenna or speaker unit.

For releasably securing the slide 20 in connected relation to the base 18 and retaining the pins and sockets in electrical contact, the bottom wall 80 is provided with a spring locking tab or lug 166 in the form of a flat leaf spring member having one end anchored to a recess 168 in the bottom wall 80 by a rivet 170 or other suitable fastening device and the free end thereof projecting upwardly and forwardly through an opening 172 provided in the recess 168 and engaged with the shoulder or detent 44 when the slide 20 moves all the way to the rear in relation to the base 18, as illustrated in FIG. 2, with the resiliency of the spring tab 166 enabling the deflection of the free end thereof downwardly as the slide moves rearwardly onto the base until the free end of the locking tab aligns with the detent or shoulder 44 at which time it will spring upwardly into engagement with the detent or shoulder 44, thus locking the slide in place.

In order to release the slide, a release plate 174 is disposed in overlying relation to the bottom wall 80 with the release plate sliding along the upper surface of the channel-shaped member 94 and upwardly offset portions of the bottom wall 80. The release plate 174 includes an opening 176 through which the spring locking tab or lug 166 passes. The release plate 174 is provided with a plurality of slot-like openings 178 therein having an oval-shaped configuration with the major access thereof extending longitudinally for receiving fastening screws 180 which are threaded into the bottom wall in a manner which will enable longitudinal sliding movement of the release plate 174 within the limits defined by the slots 178. The forward end of the release plate is downwardly offset, as at 182, with a forward offset portion 184 engaging the upper surface of the forward end portion of the bottom wall 80. The forward end of the slide portion 184 terminates in an upwardly extending end wall 186 spaced from and generally parallel to and slightly longer than the front wall 84 with the upwardly facing area 188 providing a finger grip for receiving the fingers 190 of the hand 192 of a person releasing the spring lock tab 166 by sliding the release plate 174 forwardly so that the rear edge of the opening 176 will engage the upwardly and forwardly inclined upper surface of the spring lock tab 166, thus biasing or deflecting the spring lock tab downwardly for disengaging it from the detent or shoulder 44 thus enabling the slide to be moved forwardly for quick disconnection from the base 18. The upstanding member 186 defines a release bar or hand gripping element to facilitate forward movement of the release bar by engaging the fingers therewith and pulling forwardly so that a single force will be utilized to move the release bar forwardly, thus releasing the locking tab 166 and at the same time moving the CB radio forwardly along with the slide to the position illustrated in FIG. 7, thus facilitating release of the slide.

The rear of the upwardly offset portion 168 of the bottom wall 80 is provided with a centrally disposed pin 194 which has a terminal rear end extending through an aperture 196 in the depending rear end 198 of the release plate 174. A coil compression spring 200 encircles the pin 194 with one end engaging the downturned rear end 196 of the release plate and the other end engaging the offset 168, thus spring biasing the release plate 174 rearwardly in the manner illustrated in FIG. 4, so that the screw fasteners 180 are in the forward portions of the slot-like openings 178 and the release bar 186 is disposed rearwardly of the forward wall 84 and the rear edge of the opening 176 does not retain the locking tab 166 in a downwardly deflected position. Thus, the normal position of the release plate 174 is such that when the slide is moved rearwardly onto the base, the locking tab 166 will be operative to lock the slide in position when it is fully assembled onto the base.

In order to protect the pin block 128 and the pins and associated electrical wiring, the release plate 174 is provided with a generally L-shaped protector plate 202 having an angulated flange 204 secured to the offset portion 182 by fasteners 206 with the horizontal portion of the protector plate 202 overlying and slidable along the top surface of the pin block 128 slightly rearwardly of the offset flange or visor 164, as illustrated in FIG. 5, so that even when the release plate 174 is moved forwardly, the rear edge of the protector plate 202 will still overlie the forward edge of the pin block 128 in order to protect the electrical conductors, coaxial cable and socket and pin assemblies.

The beveled or inclined surfaces guide the radio or other equipment into position for easier insertion and provides precise alignment. The slide-type latch is released by movement in the same direction as removal of the radio for easy withdrawal. The power connections, including the pin and socket connections, eliminate damage to the radio which sometimes can result from damaged or corroded leaf spring type contacts and all of the connectors are permanently encapsulated in the base and slide to prevent damage and misalignment of these components. The spring tab and release plate are constructed of metal, as is the cover plate on the base. The other components, except for the screw fasteners and electrical conductors, are constructed of plastic material, thus rendering the device relatively inexpensive to manufacture and neat and attractive in appearance with the base which remains on the vehicle being devoid of any sharp edges or protuberances which could possibly cause injury.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. A slide mount for CB radios or other electrical or electronic equipment comprising: a base and a slide, one of which is adapted to be connected to a supporting structure and the other adapted to be connected with a CB radio, or the like, means releasably interconnecting said slide and base with said means being rendered effective and ineffective in response to relative sliding movement between the base and slide, latch means releasably locking the base and slide in interconnected relation by positively precluding relative sliding movement, and release means for said latch means to enable separation of the base and slide by permitting relative sliding movement, said release means including handle means manually actuated by exerting force in the direction of longitudinal relative movement between the base and slide whereby the same longitudinal force exerted to actuate the release means will move the base and slide in relation to each other for separating the base and slide.

2. The structure as defined in claim 1, wherein said latch means includes a coacting detent and a retractable, resilient lock member interconnecting the base and slide, said release means being in the form of a longitudinally movable member having a transverse surface in camming engagement with the lock member to move it away from the detent in response to longitudinal movement of the release means thereby enabling relative longitudinal movement between the base and slide.

3. The structure as defined in claim 2 wherein said lock member is mounted on the slide and said detent is provided on the base, said base adapted to be engaged with a supporting structure and said slide adapted to be engaged with a CB radio, or the like, with the handle means including a release bar located adjacent the end of the slide disposed outwardly of the slide mount to provide access thereto.

4. The structure as defined in claim 3 wherein said movable member is in the form of a sliding plate, spring means biasing said sliding plate to a retracted position, said lock member being in the form of a leaf spring having a free end extending upwardly through an aperture in the sliding plate with the resiliency of the leaf spring enabling the sliding interconnection between the slide and base and engageable with the detent when the slide and base are completely assembled, movement of the edge of the aperture in the slide plate engaging the edge of the aperture with the leaf spring and deflecting it away from the detent to enable disassembly of the base and slide.

5. The structure as defined in claim 3, wherein said slide includes a transversely extending mounting member, a pair of bracket members projecting laterally from said mounting member and adapted to straddle and be secured to the side walls of a radio, and slot and fastener means interconnecting said bracket members and mounting member to enable the bracket members to be adjusted for straddling engagement with radios of various dimensional characteristics.

6. The structure as defined in claim 1 wherein said base and slide including terminal blocks with pin and socket electrical connectors rigidly fixed thereto for telescopic contact when the base and slide are interconnected and separation when the base and slide are separated, one of the said pin and socket connectors being a power supply with the power supply pin being shorter than the others to assure that contact is made between all the other pins and sockets prior to contact between the power pin and socket.

7. The structure as defined in claim 6 wherein one of said pin and socket connectors is a coaxial pin and socket connector for forming a connection between a coaxial cable connected to a receiving and transmitting antenna and a CB radio.

8. The structure as defined in claim 6 wherein said base includes a cover plate overlying the terminal block and connectors thereby defining a fully enclosed junction box to protect connections from damage and shorting.

9. The structure as defined in claim 1 wherein said means interconnecting said base and slide includes a pair of longitudinally extending side wall surfaces terminating in an inner free edge on the base, said slide including a pair of longitudinally extending side walls terminating in inwardly extending free outer edges for positioning into longitudinal sliding overlying relation to the free edges on the side walls of the base, said side walls on the base and slide being laterally inclined with the major transverse dimension between the longitudinal walls being at the inner edge of the side walls on the base and adjacent the inturned edges of the side walls on the slide, end portions of the inturned edges on the side walls on the slide being omitted for a predetermined distance at the end of the slide initially assembled with the base to facilitate engagement and alignment of the inclined surfaces and inturned edges and free edges on the side walls to facilitate precise alignment and assembly of the slide on the base.

10. The structure as defined in claim 9 wherein the side walls on the slide are hollow members defining conduits for carrying cables and wires to the rear of the slide in a protected and concealed manner to points in close proximity to connectors on the rear of the radio.

11. The structure as defined in claim 9 wherein said inclined walls are slightly tapered longitudinally to provide a close fit therebetween when assembled thereby precluding lateral play between the slide and base when assembled.

12. The structure as defined in claim 11 wherein said latch means includes a coacting detent and resilient lock member interconnecting the base and slide, said release means being in the form of a longitudinally movable member having a transverse surface in camming engagement with the lock member to move it away from the detent in response to longitudinal movement of the release means thereby enabling relative longitudinal movement between the base and slide, said base and slide including terminal blocks with pin and socket electrical connectors rigidly fixed thereto for telescopic contact when the base and slide are interconnected and separation with the base and slide are separated.

* * * * *